(12) United States Patent
Chen et al.

(10) Patent No.: US 12,444,928 B2
(45) Date of Patent: Oct. 14, 2025

(54) POWER SYSTEM PROTECTION DEVICE WITH CURRENT LIMITING AND CONTROLLED SWITCHING FUNCTIONS FOR AC AND DC APPLICATIONS

(71) Applicant: EATON INTELLIGENT POWER LIMITED, Dublin (IE)

(72) Inventors: Steven Z. Chen, Coraopolis, PA (US); Karthikeyan Subramaniam, Carnegie, PA (US); Xin Zhou, Wexford, PA (US); Tyler Holp, Coraopolis, PA (US); Andy Schroedermeier, Whitefish Bay, WI (US); Steven Schmalz, Franklin, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 134 days.

(21) Appl. No.: 18/220,322

(22) Filed: Jul. 11, 2023

(65) Prior Publication Data
US 2025/0023341 A1    Jan. 16, 2025

(51) Int. Cl.
*H02H 7/22* (2006.01)
*H02H 1/00* (2006.01)

(52) U.S. Cl.
CPC .......... *H02H 7/222* (2013.01); *H02H 1/0023* (2013.01)

(58) Field of Classification Search
CPC .... H02H 7/222; H02H 1/0023; H02H 1/0015; H01H 9/542
USPC .......................................................... 361/2
See application file for complete search history.

(56) References Cited

U.S. PATENT DOCUMENTS

| | | |
|---|---|---|
| 11,615,925 B2 | 3/2023 | Manahan et al. |
| 2014/0043714 A1* | 2/2014 | Benke ...................... H02H 3/10 361/42 |
| 2020/0076181 A1* | 3/2020 | Reuberger ........... H02H 1/0023 |
| 2021/0128909 A1* | 5/2021 | Klapper .................... H02H 5/12 |
| 2022/0122801 A1 | 4/2022 | Peng et al. |

(Continued)

OTHER PUBLICATIONS

European Patent Office "International Search Report and Written Opinion", for corresponding International Patent Application No. PCT/IB2024/055853, mailed Sep. 20, 2024, 14 pp.

*Primary Examiner* — Sreeya Sreevatsa
(74) *Attorney, Agent, or Firm* — Eckert Seamans Cherin & Mellott, LLC (57) ABSTRACT

An arc fault mitigator includes a sensor structured to detect at least one of a user within vicinity of the power system protection device, a light within the power system protection device and an overcurrent within the power system protection device; a mechanical switching device including a fast mechanical circuit interrupter and an actuator; a power electronics circuit coupled to the mechanical switching device in parallel and including a current commutator structured to commutate current from the fast mechanical circuit interrupter to the power electronics circuit upon turning OFF of the fast mechanical circuit interrupter, a power electronic circuit interrupter structured to allow the current to ride there-through up to a threshold current, and a current limiter structured to limit the current flowing through the power electronics circuit interrupter; and a controller including a trip control structured to control operations of the mechanical switching device and the power electronics circuit.

15 Claims, 5 Drawing Sheets

(56) References Cited

U.S. PATENT DOCUMENTS

2022/0189713 A1\*  6/2022  Strassel .................. H01H 9/542
2023/0068787 A1   3/2023  Zhou et al.

\* cited by examiner

POWER SYSTEM PROTECTION DEVICE WITH CURRENT LIMITING AND CONTROLLED SWITCHING FUNCTIONS FOR AC AND DC APPLICATIONS

FIELD OF THE INVENTION

The disclosed concept relates generally to a power system protection device and method, and in particular, to a power system protection device with current limiting and controlled switching functions in a power distribution system.

BACKGROUND OF THE INVENTION

A switchgear is a freestanding enclosed assembly structured to protect power system or equipment from short circuits and fault currents and isolate electrical circuits from power supplies during an event of fault. A medium voltage (MV) switchgear with rated voltages of, e.g., without limitation, 4.76 to 38 kV for AC (alternative current) and/or DC (direct current) applications requires fast arc fault mitigation. For MV switchgears, arc energy can be pressure built-up to a limit and may cause an explosion of the switchgear involved within approximately, e.g., without limitation, a ½ cycle (e.g., without limitation, 8-10 ms), damage adjacent switchgear equipment and injure personnel in proximity. Fast grounding switches can convert an arc fault to a bolted ground fault by redirecting the arc fault current to ground with lowest impedance current path in approximately, e.g., without limitation, 3-5 ms upon receiving a trip command. However, such fast grounding switches are often designed for one-time use, and will have to be replaced after operation. Further, other equipment in the circuit may have to endure the fault current until the circuit is interrupted by a circuit breaker, which may take tens of milliseconds, if not longer, thereby resulting in further damages. Fast circuit breakers may interrupt a short circuit in about, e.g., without limitation, 30 ms upon receiving a trip command. However, by that time, damages to the circuit may have already resulted from the arc energy because gas pressure caused by the arc will exceed the limit of a normal switchgear in less than, e.g., without limitation, 10 ms. In some examples, a switchgear may include an arc-resistant feature with a strong structure, e.g., without limitation, a metal box, a chimney, etc., that is often disposed on top or back of the switchgear with a tunnel or path that redirects the arc energy. Such an arc-resistant switchgear is required to withstand rated arcing current for 500 ms and release the arc energy in a particular direction. However, it is very expensive and with the 500 ms durability, the arc-resistant switchgear and/or equipment disposed adjacent thereto may be destroyed by an arc with high severity. Further, when the switchgear is open during maintenance, the arc-resistant feature needs to be disabled.

There is room for improvement in arc fault mitigation in switchgears.

There is also room for improvement in fast interruption of power system protection devices.

SUMMARY OF THE INVENTION

An example embodiment of the disclosed concept provides an arc fault mitigator for a power system protection device. The arc fault mitigator includes a sensor structured to detect at least one of a user within vicinity of the power system protection device, a light within the power system protection device and an overcurrent within the power system protection device; a mechanical switching device comprising a fast mechanical circuit interrupter and an actuator structured to actuate the fast mechanical circuit interrupter; a power electronics circuit coupled to the mechanical switching device in parallel, the power electronics circuit comprising a current commutator structured to commutate current from the fast mechanical circuit interrupter to the power electronics circuit upon turning OFF of the fast mechanical circuit interrupter, a power electronic circuit interrupter coupled to the current commutator and structured to allow the current to ride there-through up to a threshold current, and a current limiter coupled to the current commutator and the power electronic circuit interrupter, the current limiter structured to limit the current flowing through the power electronics circuit interrupter within the threshold current; and a controller coupled to the sensor, the mechanical switching device and the power electronics circuit, the controller comprising a trip control structured to control operations of the mechanical switching device and the power electronics circuit based at least in part on a signal from the sensor.

Another example embodiment provides a power system protection device coupled to a power source and a load. The power system protection device includes a main circuit interrupter, one or more branch circuit interrupters, and an arc fault mitigator. The arc fault mitigator includes a sensor structured to detect at least one of a user within vicinity of the power system protection device, a light within the power system protection device and an overcurrent within the power system protection device; a mechanical switching device comprising a fast mechanical circuit interrupter and an actuator structured to actuate the fast mechanical circuit interrupter; a power electronics circuit coupled to the mechanical switching device in parallel, the power electronics circuit comprising a current commutator structured to commutate current from the fast mechanical circuit interrupter to the power electronics circuit upon turning OFF of the fast mechanical circuit interrupter, a power electronic circuit interrupter coupled to the current commutator and structured to allow the current to ride there-through up to a threshold current, and a current limiter coupled to the current commutator and the power electronic circuit interrupter, the current limiter structured to limit the current flowing through the power electronics circuit interrupter within the threshold current; and a controller coupled to the sensor, the mechanical switching device and the power electronics circuit, the controller comprising a trip control structured to control operations of the mechanical switching device and the power electronics circuit based at least in part on a signal from the sensor.

Yet another example embodiment provides a method of mitigating an arc fault. The method includes providing an arc fault mitigator within a power system protection device, wherein the arc fault mitigator comprises: (i) a sensor structured to detect at least one of a user within vicinity of the power system protection device, a light within the power system protection device and an overcurrent within the power system protection device; (ii) a mechanical switching device comprising a fast mechanical circuit interrupter and an actuator structured to actuate the fast mechanical circuit interrupter; (iii) a power electronics circuit coupled to the mechanical switching device in parallel, the power electronics circuit comprising a current commutator structured to commutate current from the fast mechanical circuit interrupter to the power electronics circuit upon turning OFF of the fast mechanical circuit interrupter, a power electronic circuit interrupter coupled to the current commutator and structured to allow the current to ride there-through up to a threshold current, and a current limiter coupled to the current commutator and the power electronic circuit interrupter, the current limiter structured to limit the current flowing through the power electronics circuit interrupter within the threshold current; and (iv) a controller coupled to the sensor, the mechanical switching device and the power electronics circuit, the controller comprising a trip control structured to control operations of the mechanical switching device and the power electronics circuit based at least in part on a signal from the sensor; detecting at least one of a user within vicinity of the power system protection device, a light within the power system protection device and an overcurrent within the power system protection device; and turning OFF the fast mechanical circuit interrupter upon detecting at least one of the user within the vicinity, or turning OFF the fast mechanical circuit interrupter upon detecting the light and/or the overcurrent, but not the user within the vicinity nor the light, and confirming that the overcurrent is an arc fault.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Directional phrases used herein, such as, for example, left, right, front, back, top, bottom and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As employed herein, the statement that two or more parts are "coupled" together shall mean that the parts are joined or operate together either directly or indirectly, i.e., through one or more intermediate parts or components, so long as a link occurs.

Example embodiments of the disclosed concept provides an arc fault mitigator that advantageously provides multiple operation modes: (i) an instant interruption mode upon detection of a user within the vicinity of a power system protection, or upon confirming that an overcurrent detected within the power system protection device is an arc fault; (ii) a coordinated protection and fault current limiting mode; and (iii) a fault current ride-through mode. The instant interruption mode limits an arc from developing to a damaging level within a significantly brief period (e.g., without limitation, 2 ms) from the detection or confirmation. Since the example arc fault mitigator reacts very fast, it can handle an arc energy of, e.g., without limitation, $0.36 \text{ J/cm}^2$, which is much smaller than the arc energy that needs to be handled by the conventional power system protection devices that react much slower than the arc fault mitigator. The coordinated protection and fault current limiting mode protects the power electronic circuit interrupter by transferring a controlled amount of the fault current to the power electronic circuit interrupter, e.g., without limitation, up to 10 ms. The fault-current ride through mode allows the fault current to ride through a power electronic circuit interrupter up to a threshold current and rated duration of short circuit as required by the standards. Further, the example arc fault mitigator can protect a power system protection device in both AC and DC applications. Since it prevents potential damages to the power system protection device from an arc fault, it is reusable for as long as needed. Further, it minimizes the disturbance to the system caused by the fault or transient conditions.

Figure 1:
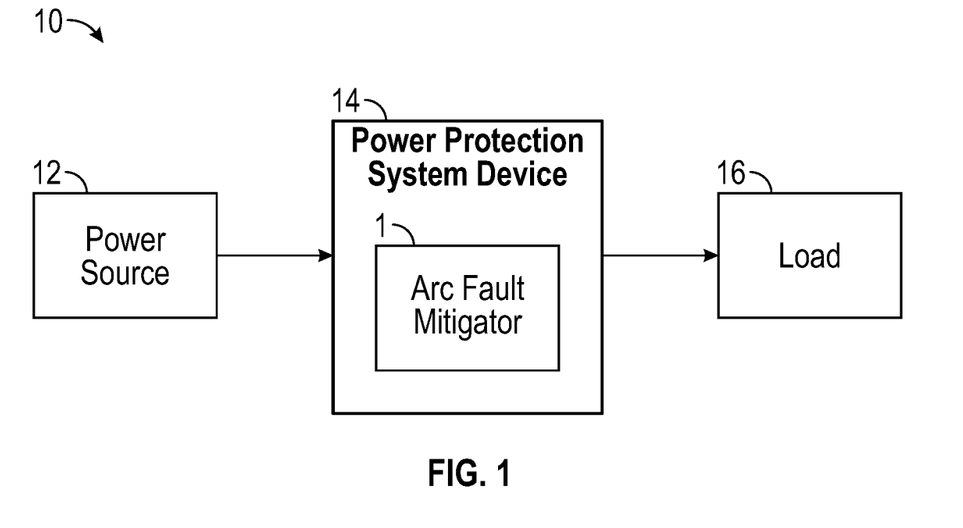
FIG. 1 is a block diagram of an exemplary power distribution system in accordance with a non-limiting embodiment of the disclosed concept.
Figure 2:
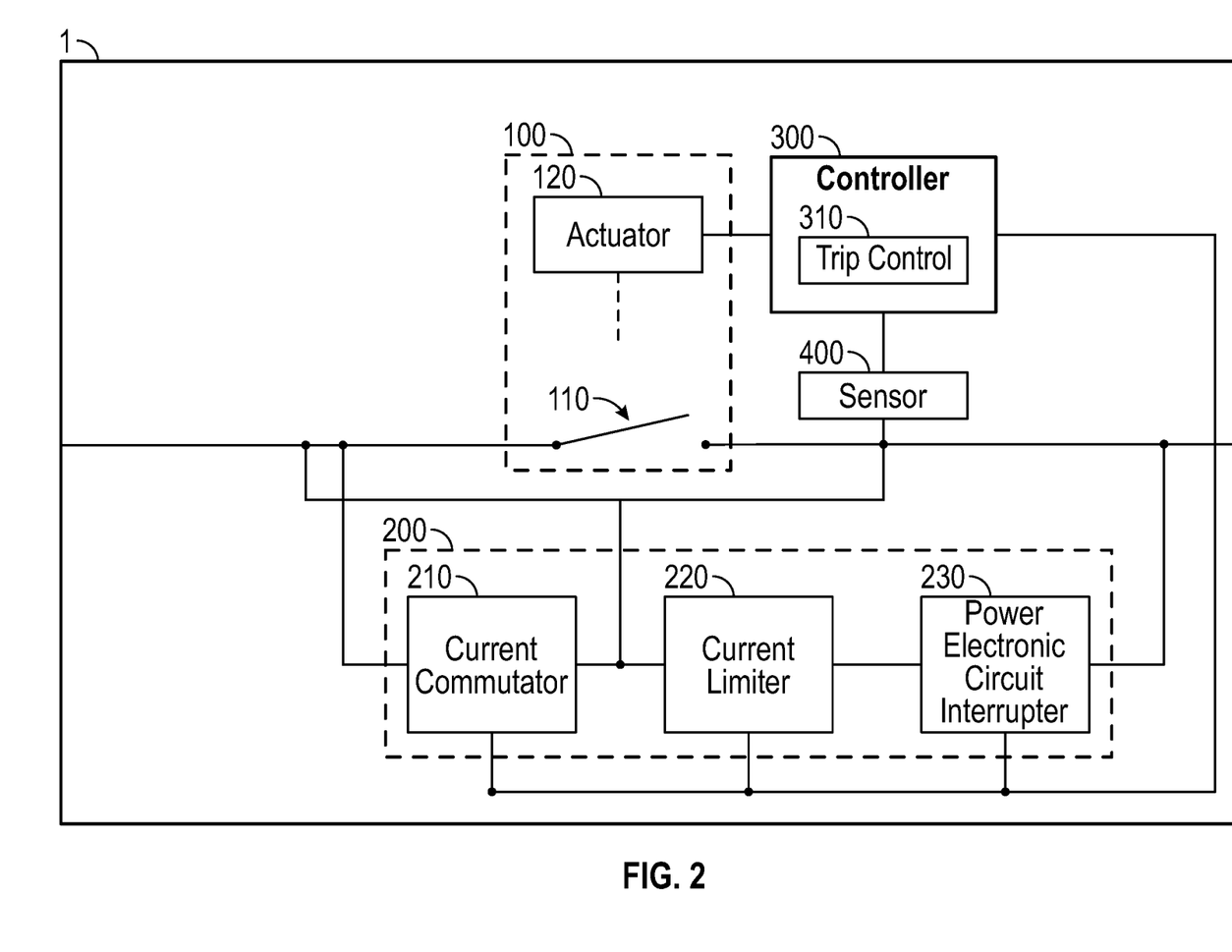
FIG. 2 is a block diagram of an exemplary arc fault mitigator in accordance with a non-limiting embodiment of the disclosed concept.
Figure 3:
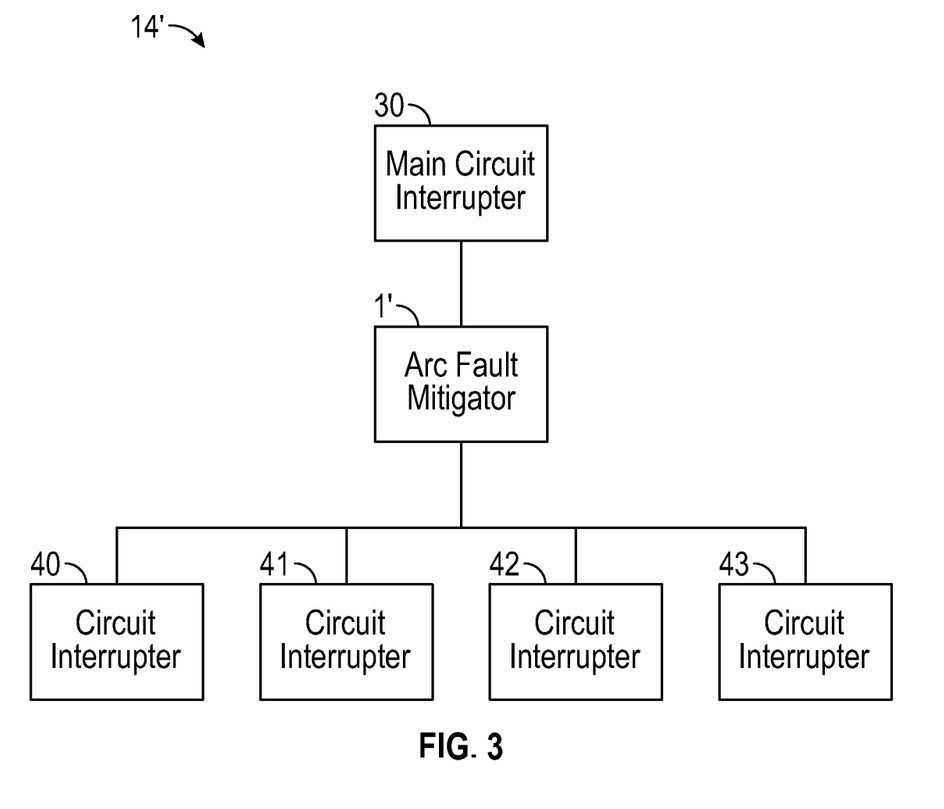
FIG. 3 illustrates a block diagram of an example power system protection device in accordance with a non-limiting embodiment of the disclosed concept.

FIG. 1 is a block diagram for an exemplary power distribution system 10 in accordance with a non-limiting, example embodiment of the disclosed concept. The system 10 includes a power system protection device 14 coupled to a power source 12 and a load 16. The power system protection device 14 may be, a medium voltage switchgear or controlgear. It may include a main circuit breaker 30 and a plurality of branch breakers 40-43 as shown in FIG. 3. The power protection system device 14 includes an arc fault mitigator 1, which may be inserted within an existing power protection system device 14 and connect the main circuit breaker 30 to the plurality of branch breakers 40-43. The arc fault mitigator 1 may be a hybrid circuit breaker including a mechanical switching device 100 and a power electronics circuit 200 disposed in parallel to the mechanical switching device 100 as shown in FIG. 2. The arc fault mitigator 1 is discussed in detail with reference to FIGS. 2-4.

FIG. 2 is a block diagram of an exemplary arc fault mitigator 1 in accordance with a nonlimiting, example embodiment of the disclosed concept. The arc fault mitigator 1 includes, at least a mechanical switching device 100, a power electronics circuit 200, a controller 300, and a sensor 400. The controller 300 is coupled to the mechanical switching device 100 and the power electronics circuit 200. It may be a processing unit including a processor (e.g., without limitation, a controller, a microcontroller, etc.) and a memory. The controller 300 includes a trip control 310, e.g., a trip decision logic or algorithm, structured to control the operations of the mechanical switching device 100 and the power electronics circuit 200. The sensor 400 is coupled to at least the controller 300, the mechanical switching device 100 and the power electronics circuit 200, and structured to detect at least one of a user within the vicinity of the power system protection device 14, a light within the power system protection device 14 and an overcurrent within the power system protection device 14. The sensor 400 may include a voltage sensor, a current sensor, a light sensor structured to detect any light within the power system protection device 14, a thermal sensor and/or a motion sensor structured to detect a user (e.g., without limitation, a field engineer) within the vicinity of the power system protection device 14.

The mechanical switching device 100 is coupled in parallel to the power electronics circuit 200. The mechanical switching device 100 may include a fast mechanical circuit interrupter 110 and an actuator 120. The fast mechanical circuit interrupter 110 may be any mechanical switch, e.g., without limitation, a contactor and/or a pair of contacts that are enclosed in a vacuum for fast switching. The actuator 120 is capable of forcing the fast mechanical circuit interrupter 110 to open very fast, e.g., without limitation, less than 200 μs (hereinafter, also referred to as a first period) from detection of at least one of the user, the light and the overcurrent. It may be, e.g., without limitation, a Thomson coil-based actuator, which may cause the contacts 110 to open about 20 times faster than traditional actuators such as a solenoid or a spring.

The power electronics circuit 200 may include a current commutator 210, a current limiter 220, and a power electronic circuit interrupter 230, which operate based at least in part on the trip decision logic (i.e., the trip control 310). The current commutator 210 is structured to transfer or commutate current from the fast mechanical circuit interrupter 110 to the power electronic circuit 200 upon opening of the fast mechanical circuit interrupter 110. The current commutator 210 may be, e.g., without limitation, a transient commutation current injector. The current limiter 220 is structured to limit the current flowing to the power electronic circuit interrupter 230 within a threshold current. The threshold current depends on the rated current. For example, where the continuous current at 2 kA is provided, the threshold current may be set at, e.g., without limitation, 4 kA. The current limiter 220 may be a device or controlled-algorithm that, e.g., pulses a device (e.g., without limitation, a motor) at varying rate to limit the current as the device winds up, such that the device can start slowly without a high inrush current. As such, the current limiter 220 ensures that excessive current beyond the threshold current does not flow through the power electronics circuit 200. The power electronic circuit interrupter 230 is structured to allow the fault current to ride through up to the threshold current. It allows the ride through within the rated duration of short circuit as required under the standards (e.g., without limitation, IEC as discussed below). The power electronic circuit interrupter 230 may be a solid state switch device including, e.g., without limitation, an insulated-gate bipolar transistors (IGBTs) and metal oxide varistors (MOVs).

The arc fault mitigator 1 is advantageous in that it is structured to conform to the current International Standards IEC for three-phase AC current protection devices. For example, section 5.6 of IEC 62271-100 defines rated short-time withstand current ($I_k$), i.e., the RMS value of the short-circuit current that a switchgear and controlgear can carry in the closed position during its rated duration under its service conditions. Section 5.7 defines rated peak withstand current ($I_p$), i.e., the peak current associated with the first major loop of the rated short-time withstand current that the switchgear and controlgear can carry in the closed position under its service conditions. A DC time constant of 45 ms covers the majority of cases and corresponds to a rated peak withstand current equal to 2.5 times the rated short-time withstand current for a rated frequency of 50 Hz. For a rated frequency of 60 Hz, it is equal to 2.6 times the rated short-time withstand current. Section 5.8 defines rated duration of short-circuit ($t_k$), i.e., the interval of time for which the switchgear and controlgear can carry, in the closed position, a current equal to its rated short-time withstand current. The preferred value of rated duration of short-circuit is 1 s.

Conventional power electronics switching devices (e.g., solid state switches) may act sufficiently fast to prevent any damage to the power system protection devices as a result of an arc fault, but cannot withstand the rated short-time withstand current nor the rated peak withstand current as required by the standards. Conventional mechanical switches may be able to withstand the rated peak withstand current, but may not act sufficiently fast to prevent damages to the power system protection devices. However, as discussed below, the arc fault mitigator 1 satisfies all of the rated short-time withstand current, the rated peak withstand current and the rated duration of short-circuit as required by the standards.

The fast mechanical circuit interrupter 110 provides an immediate interruption well within the rated duration of short-circuit. For example, if the sensor 400 detects at least a user (e.g., a field engineer or other person) within the vicinity of the power system protection device 14, the trip control 310 is structured to cause the fast mechanical circuit interrupter 110 to be turned OFF. It interrupts the current immediately (e.g., within a first period (e.g., without limitation, 200 μs from the detection)) from flowing through the power system protection device 14. Alternatively, if the sensor 400 detects an overcurrent and/or light, but not the user, the trip control 310 is structured to cause the fast mechanical circuit interrupter 110 to be turned OFF and confirm that the light and/or the overcurrent is an arc fault. Upon reaching the first period (e.g., without limitation, 200 μs), the trip control 310 is further structured to cause the current commutator 210 and the power electronic circuit interrupter 230 to be turned ON, initiate current limiting via the current limiter 220 upon reaching a second period (e.g., without limitation, 350 μs), determine if the overcurrent and/or the light is an arc fault, and based on a determination that the overcurrent and/or the light is an arc fault, cause the power electronic circuit interrupter 230 to be turned OFF within a third period, e.g., without limitation, 2 ms). The current limiter 220 starts to limit the current flowing through the power electronic circuit interrupter 230 to be within the threshold current such that the power electronic circuit interrupter 230 is not damaged during the ride-through of the fault current. Therefore, the arc fault mitigator 1 provides instant protection of personnel and/or property upon detection of an arc fault and/or a user within vicinity of the power system protection device 14, well within the rated duration of short-circuit.

Further, the arc fault mitigator 1 is advantageous over the conventional tripping mechanisms in various ways. It provides novel multiple operation modes: (i) an instant interruption mode that provides personnel and property protection and/or limits an arc from developing to a damaging level; (ii) a coordinated protection and fault current limiting mode that transfers a controlled amount of the fault current to the power electronic circuit interrupter 230, thereby protecting the power electronics components therein; and (iii) a fault current ride-through mode that allows the fault current to ride through the power electronic circuit interrupter 230 up to a rated withstand short circuit current and rated duration of short-circuit as required by the standards. No conventional tripping mechanism provides such multiple operation modes. In addition, since the arc fault mitigator 1 reacts so fast, it only needs to handle an arc energy of, e.g., without limitation, 0.36 J/cm2, which is much smaller than the arc energy that the conventional power system protection devices need to handle. Further, the arc fault mitigator 1 can protect the power system protection device 14 in both AC and DC applications. Since it prevents potential damages to the power system protection device 14 from an arc fault, it is reusable for as long as necessary. Further, it minimizes the disturbance to the power distribution system 10 caused by the fault or transient conditions. In addition, the arc fault mitigator 1 also coordinates with the main controller (not shown) of the power system protection device 14 for handling a non-arc fault overcurrent. For example, based on a determination that the detected overcurrent and/or the light is not an arc fault, the trip control 310 is further structured to hand over the trip decision control to the main controller of the power system protection device 14. For handing over the trip decision control, the trip control 310 is further structured to cause the fast mechanical circuit interrupter 110 to be turned ON within a fourth period (e.g., without limitation, 10 ms), cause the power electronic circuit interrupter 230 to be turned OFF, and hand over the trip decision control to the main controller, which in turn may choose an appropriate downstream circuit interrupter to trip and clear the overcurrent.

FIG. 3 illustrates an example power system protection device 14' for a power distribution system according to a non-limiting, example embodiment of the disclosed concept. The power system protection device 14' may be a switchgear or controlgear and include a main circuit interrupter 30, an arc fault mitigator 1', and one or more downstream circuit interrupters 40-43. The arc fault mitigator 1' is similar to the arc fault mitigator 1 as described with reference to FIGS. 1 and 2. Thus, some overlapping description may be omitted for the sake of brevity. The arc fault mitigator 1' may be a hybrid circuit breaker with the fast mechanical circuit interrupter 110 disposed in parallel to the current commutator 210, the current limiter 220 and the power electronic circuit interrupter 230. The arc fault mitigator 1' may be located in a main power branch, and thus coordinate with all other breakers (e.g., without limitation, the upstream and downstream circuit breakers 30, 40-43). In some examples, the arc fault mitigator 1' may have rated voltage of 15 kV AC. It may have continuous current at 2 kA. It may also have short-circuit withstand current at 25 kA, peak withstand current at 65 kA, and/or breaking current at 10 kA with the instant breaker time of less than or equal to 2 ms. Thus, the arc fault mitigator 1' easily conforms to the required IEC standards. It will be understood that these values are for illustrative purposes only, and thus the arc fault mitigator 1' may include different voltage and/or current values as appropriate without departing from the scope of the disclosed concept. The main circuit interrupter 30 may be a main circuit breaker that trips the entire power distribution system when a large short circuit or overloaded state is detected. The circuit interrupters 40-43 may be branch circuit breakers coupled to a specific area or equipment for protection. It will be understood that this is for illustrative purposes only, and thus the power system protection device 14' may include different numbers of circuit interrupters within the device as appropriate without departing from the scope of the disclosed concept. The power system protection device 14' may include a main controller upstream to the circuit interrupters 40-43. When the arc fault mitigator 1' detects an overcurrent and/or or a light that is not an arc fault, the arc fault mitigator 1' may hand over the trip decision control to the main controller, which in turn decides an appropriate circuit interrupter to handle the overcurrent.

Figure 4:
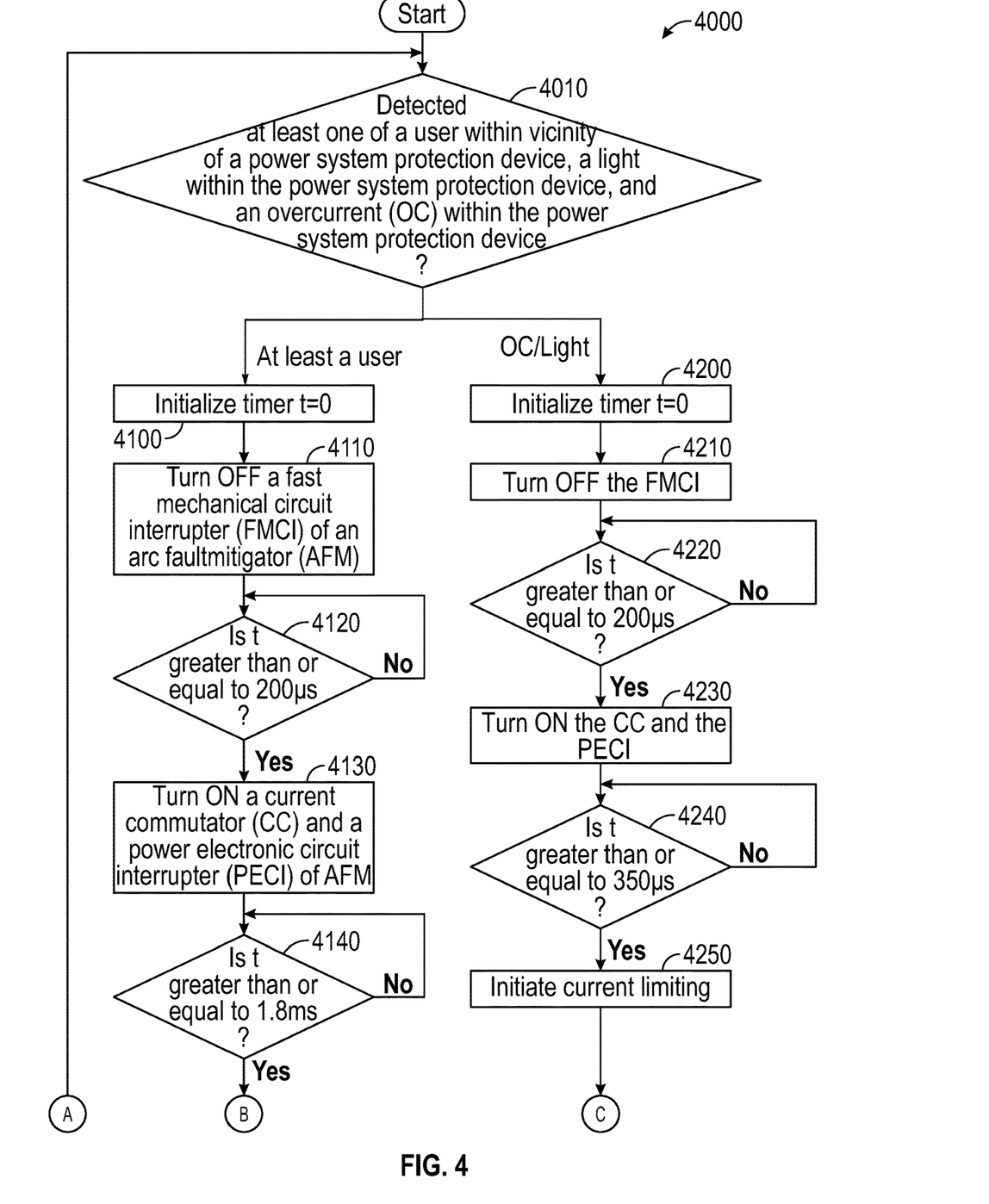
FIG. 4 is a method for mitigating an arc fault using an exemplary arc fault mitigator of FIG. 2 in accordance with a non-limiting embodiment of the disclosed concept.

FIG. 4 illustrates a method 4000 for mitigating an arc fault using the arc fault mitigator 1 of FIG. 2 in accordance with the disclosed concept. The method 4000 is performed by a controller 300, a trip control 310 or any other components of the arc fault mitigator 1.

At 4010, the trip control determines if the sensor has detected at least one of a user within vicinity of a power system protection device, a light within the power system protection device and an overcurrent within the power system protection device. The user may be in the vicinity of the power system protection device if the user is within, e.g., without limitation, 1 meter of the power system protection device or within a power room. If the trip control determines that the sensor has detected at least the user within the vicinity, the method 4000 proceeds to 4100. That is, if the trip control determines that the sensor has detected a user within the vicinity, a user and a light, a user and an overcurrent, or a user and a light as well as an overcurrent, the method 4000 proceeds to 4100. If the trip control determines that the sensor has detected an overcurrent and/or light, but no user in vicinity, then the method 4000 proceeds to 4200. If the trip control determines that none of the user, the overcurrent or the light has been detected, then the power system protection device performs normal operations.

At 4100, the trip control initiates a timer (i.e., sets t=0).

At 4110, the trip control causes a fast mechanical current interrupter to be turned OFF.

At 4120, the trip control determines if t is greater than or equal to a first period. The first period may be, e.g., without limitation, 200 μs from t=0. This delay provides sufficient time for the fast mechanical circuit interrupter to open completely. If no, the trip control waits until t is greater than or equal to the first period. If yes, the method 4000 proceeds to 4130.

At 4130, the trip control causes a current commutator and a power electronic circuit interrupter of the arc fault mitigator to be turned ON simultaneously.

At 4140, the trip control determines if t is greater than or equal to a fifth period, e.g., without limitation, 1.8 ms from t=0. If no, the trip control waits until t becomes greater than or equal to the fifth period. This delay provides sufficient time for the current commutator to commutate the current from the fast mechanical circuit interrupter to and through the power electronic circuit interrupter. If yes, the method 4000 proceeds to 4150.

At 4150, the trip control causes the power electronic circuit interrupter to be turned OFF within a third period, e.g., without limitation, 2 ms from t=0. The method 4000 then returns to 4010.

At 4200, the trip control initiates the timer and sets t=0.

At 4210, the trip control causes the fast mechanical circuit interrupter to be turned OFF.

At 4220, the trip control determines if the timer has reached the first period (e.g., without limitation, 200 μs from t=0). If no, the trip control waits until t is greater than or equal to the first period. If yes, the method 4000 proceeds to 4230.

At 4230, the trip control causes the current commutator and the power electronic circuit interrupter to be turned ON simultaneously.

At 4240, the trip control determines if t is greater than or equal to a second period, e.g., without limitation, 350 μs from t=0. If no, the trip control waits until t is greater than or equal to the second period. If yes, the method 4000 proceeds to 4250.

At 4250, the trip control initiates current limiting.

At 4260, the trip control determines if the overcurrent and/or light is an arc fault. If yes, the method 4000 proceeds to 4270. If no, the method 4000 proceeds to 4280.

At 4270, the trip control causes the power electronic circuit interrupter to be turned OFF within the third period. Then, the method 4000 returns to 4010.

At 4280, the trip control causes the fast mechanical circuit interrupter to be turned ON. That is, the trip control causes the fast mechanical circuit interrupter to start to be turned ON upon determining that the overcurrent and/or the light is not an arc fault, and complete to be turned ON within a fourth period, e.g., without limitation, 10 ms. At 4282, the trip control causes the power electronic circuit interrupter to be turned OFF. At 4284, the trip control hands over the trip decision control to a main controller of the power system protection device. The main controller in turn causes an appropriate remote downstream circuit interrupter to be turned OFF within a sixth period, e.g., without limitation, 50 ms and clear the overcurrent. Then, the method 4000 returns to 4010.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An arc fault mitigator for a power system protection device, comprising:
    a sensor structured to detect at least one of a user within vicinity of the power system protection device, a light within the power system protection device and an overcurrent within the power system protection device;
    a mechanical switching device comprising a fast mechanical circuit interrupter and an actuator structured to actuate the fast mechanical circuit interrupter;
    a power electronics circuit coupled to the mechanical switching device in parallel, the power electronics circuit comprising a current commutator structured to commutate current from the fast mechanical circuit interrupter to the power electronics circuit upon turning OFF of the fast mechanical circuit interrupter, a power electronic circuit interrupter coupled to the current commutator and structured to allow the current to ride there-through up to a threshold current, and a current limiter coupled to the current commutator and the power electronic circuit interrupter, the current limiter structured to limit the current flowing through the power electronics circuit interrupter within the threshold current; and
    a controller coupled to the sensor, the mechanical switching device and the power electronics circuit, the controller comprising a trip control structured to control operations of the mechanical switching device and the power electronics circuit based at least in part on a signal from the sensor,
    wherein the trip control is further structured to:
        cause the fast mechanical circuit interrupter to be turned OFF upon detecting by the sensor at least one of the user within the vicinity of the power system protection device, or
        cause the fast mechanical circuit interrupter to be turned OFF upon detecting by the sensor the light and/or the overcurrent, but not the user, and confirm if the light and/or the overcurrent is an arc fault,
    wherein, upon causing the fast mechanical circuit interrupter to be turned OFF upon detecting by the sensor at least one of the user, the trip control is further structured to:
        cause the current commutator and the power electronic circuit interrupter to be turned ON upon reaching a first period; and
        cause the power electronic circuit interrupter to be turned OFF within a third period.

2. The arc fault mitigator of claim 1, wherein for confirming if the light and/or the overcurrent is an arc fault, the trip control is further structured to:
    cause the current commutator and the power electronic circuit interrupter to be turned ON upon reaching a first period;
    initiate current limiting via the current limiter upon reaching a second period; and
    determine if the light and/or the overcurrent is an arc fault.

3. The arc fault mitigator of claim 2, wherein, based on a determination that the overcurrent and/or the light is an arc fault, the trip control is further structured to cause the power electronic circuit interrupter to be turned OFF within a third period.

4. The arc fault mitigator of claim 2, wherein, based on a determination that the overcurrent and/or the light is not an arc fault, the trip controller is further structured to hand over trip decision control to a main controller of the power system protection device.

5. The arc fault mitigator of claim 4, wherein for handing over trip decision control, the trip control is further structured to:
    cause the fast mechanical circuit interrupter to be turned ON within a fourth period;
    cause the power electronic circuit interrupter to be turned OFF; and
    hand over the trip decision control to the main controller of the power system protection device.

6. The arc fault mitigator of claim 5, wherein the first period comprises 200 µs, the second period comprises 350 µs, the third period comprises 2 ms, and the fourth period comprises 10 ms.

7. The arc fault mitigator of claim 1, wherein the arc fault mitigator satisfies all of current short-circuit withstand requirements comprising a rated short-time withstand current, a rated peak withstand current, and a rated duration of short-circuit.

8. The arc fault mitigator of claim 1, wherein the power electronic circuit interrupter comprises at least an insulated-gate bipolar transistors (IGBTs) and metal oxide varistors (MOVs).

9. A power system protection device coupled to a power source and a load, comprising:
    a main circuit interrupter;
    one or more branch circuit interrupters;
    an arc fault mitigator coupled downstream to the main circuit interrupter and upstream to the one or more branch circuit interrupters, the arc fault mitigator comprising:
        a sensor structured to detect at least one of a user within vicinity of the power system protection device, a light within the power system protection device and an overcurrent within the power system protection device;
        a mechanical switching device comprising a fast mechanical circuit interrupter and an actuator structured to actuate the fast mechanical circuit interrupter;
        a power electronics circuit coupled to the mechanical switching device in parallel, the power electronics circuit comprising a current commutator structured to commutate current from the fast mechanical circuit interrupter to the power electronics circuit upon turning OFF of the fast mechanical circuit interrupter, a power electronic circuit interrupter coupled to the current commutator and structured to allow the current to ride there-through up to a threshold current, and a current limiter coupled to the current commutator and the power electronic circuit interrupter, the current limiter structured to limit the current flowing through the power electronics circuit interrupter within the threshold current; and a controller coupled to the sensor, the mechanical switching device and the power electronics circuit, the controller comprising a trip control structured to control operations of the mechanical switching device and the power electronics circuit based at least in part on a signal from the sensor, wherein upon detecting by the sensor at least the user within the vicinity of the power system protection device, the trip control is further structured to:

cause the fast mechanical circuit interrupter to be turned OFF upon detecting by the sensor at least the user within the vicinity of the power system protection device; or cause the fast mechanical circuit interrupter to be turned OFF upon detecting by the sensor the light and/or the overcurrent, but not the user, and confirm if the light and/or the overcurrent is an arc fault, wherein for confirming if the light and/or the overcurrent is an arc fault, the trip control is further structured to:

cause the current commutator and the power electronic circuit interrupter to be turned ON upon reaching a first period;

initiate current limiting via the current limiter upon reaching a second period;

determine if the light and/or the overcurrent is an arc fault; and based on a determination that the light and/or the overcurrent is an arc fault, cause the power electronic circuit interrupter to be turned OFF within a third period, or based on a determination that the light and/or the overcurrent is not an arc fault, cause the fast mechanical circuit interrupter to be turned ON within a fourth period, cause the power electronic circuit interrupter to be turned OFF, and hand over trip decision control to a main controller of the power system protection device.

10. A method of mitigating an arc fault, comprising:

providing an arc fault mitigator within a power system protection device, wherein the arc fault mitigator comprises: (i) a sensor structured to detect at least one of a user within vicinity of the power system protection device, a light within the power system protection device and an overcurrent within the power system protection device; (ii) a mechanical switching device comprising a fast mechanical circuit interrupter and an actuator structured to actuate the fast mechanical circuit interrupter; (iii) a power electronics circuit coupled to the mechanical switching device in parallel, the power electronics circuit comprising a current commutator structured to commutate current from the fast mechanical circuit interrupter to the power electronics circuit upon turning OFF of the fast mechanical circuit interrupter, a power electronic circuit interrupter coupled to the current commutator and structured to allow the current to ride there-through up to a threshold current, and a current limiter coupled to the current commutator and the power electronic circuit interrupter, the current limiter structured to limit the current flowing through the power electronics circuit interrupter within the threshold current; and (iv) a controller coupled to the sensor, the mechanical switching device and the power electronics circuit, the controller comprising a trip control structured to control operations of the mechanical switching device and the power electronics circuit based at least in part on a signal from the sensor;

detecting at least one of a user within vicinity of the power system protection device, a light within the power system protection device and an overcurrent within the power system protection device; and turning OFF the fast mechanical circuit interrupter upon detecting at least one of the user within the vicinity, or turning OFF the fast mechanical circuit interrupter upon detecting the light and/or the overcurrent, but not the user within the vicinity, and confirming that light and/or the overcurrent is an arc fault; and after turning OFF the fast mechanical circuit interrupter upon detecting at least one of the user within the vicinity, causing the current commutator and the power electronic circuit interrupter to be turned ON simultaneously upon reaching a first period; and turning OFF the power electronic circuit interrupter within a third period.

11. The method of claim 10, wherein the confirming that the light and/or the overcurrent is an arc fault, comprises:

causing the current commutator and the power electronic circuit interrupter to be turned ON simultaneously upon reaching a first period;

initiating current limiting via the current limiter upon reaching a second period; and determining if the light and/or overcurrent is an arc fault.

12. The method of claim 11, wherein the confirming that the light and/or the overcurrent is an arc fault, further comprises:

based on a determination that the light and/or the overcurrent is an arc fault, causing the power electronic circuit interrupter to be turned OFF within a third period.

13. The method of claim 11, wherein confirming that the overcurrent is an arc fault further comprises:

based on a determination that the light and/or the overcurrent is not an arc fault, handing over trip decision control to a main controller of the power system protection device.

14. The method of claim 13, wherein the handing over trip decision control to a main controller of the power system protection device comprises:

causing the fast mechanical circuit interrupter to be turned ON within a fourth period;

causing the power electronic circuit interrupter to be turned OFF; and handing over the trip decision control to the main controller of the power system protection device.

15. The method of claim 14, wherein the first period comprises 200 µs, the second period comprises 350 µs, the third period comprises 2 ms, and the fourth period comprises 10 ms.

* * * * *